United States Patent
Herzog

(10) Patent No.: US 9,126,489 B2
(45) Date of Patent: Sep. 8, 2015

(54) VEHICLE CHARGING ARRANGEMENT

(71) Applicant: Bayerische Motoren Werke Aktiengesellschaft, Munich (DE)

(72) Inventor: Torsten Herzog, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/057,842

(22) Filed: Oct. 18, 2013

(65) Prior Publication Data

US 2014/0042967 A1 Feb. 13, 2014

Related U.S. Application Data

(63) Continuation of application No. PCT/EP2012/056411, filed on Apr. 10, 2012.

(30) Foreign Application Priority Data

Apr. 21, 2011 (DE) .......................... 10 2011 007 839

(51) Int. Cl.
*H01M 10/46* (2006.01)
*B60L 11/18* (2006.01)

(52) U.S. Cl.
CPC ........... *B60L 11/1816* (2013.01); *B60L 11/185* (2013.01); *B60L 11/1818* (2013.01); *B60L 11/1824* (2013.01); *B60L 11/1825* (2013.01); *B60L 11/1846* (2013.01);
(Continued)

(58) Field of Classification Search
USPC ...................................... 320/109, 111; 439/34
See application file for complete search history.

(56) References Cited

U.S. PATENT DOCUMENTS 5,545,046 A * 8/1996 Masuda et al. ................ 439/142
5,719,488 A * 2/1998 Mashino et al. ................ 322/28
(Continued)

FOREIGN PATENT DOCUMENTS

AT 507 605 A1 6/2010
AT 507 605 T 5/2011
(Continued)

OTHER PUBLICATIONS

International Preliminary Report on Patentability (PCT/IB/326) and (PCT/IB/373) including Written Opinion (PCT/ISA/237) dated Oct. 31, 2013 (eleven (11) pages).
(Continued)

*Primary Examiner* — Edward Tso
(74) *Attorney, Agent, or Firm* — Crowell & Moring LLP

(57) ABSTRACT

A vehicle charging arrangement includes a charging station outside of a vehicle, a charging cable, and an electric charging unit of the vehicle. The charging station can be supplied with electric power from an external alternating-current network. The charging cable is electrically connected to the charging station or can be electrically connected to the charging station. The charging cable can be electrically connected to the electric charging unit by way of a plug-and-socket connection. The charging station has six electric taps, and the charging cable has six electric lines. In order to charge the electric energy storage device, the six electric taps of the charging station are connected in the same configuration with the six electric lines of the charging cable, and the six electric lines of the charging cable are connected in the same configuration with at least four electric contacts of the electric charging unit.

14 Claims, 10 Drawing Sheets

(52) U.S. Cl.
CPC ......... *B60L 2230/12* (2013.01); *B60L 2230/16* (2013.01); *B60L 2240/36* (2013.01); *B60L 2270/32* (2013.01); *B60L 2270/34* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 7,253,584 | B2 * | 8/2007 | Souther et al. ................ | 320/104 |
| 8,035,341 | B2 * | 10/2011 | Genzel et al. ................ | 320/109 |
| 8,339,818 | B2 * | 12/2012 | Juhlin ........................ | 363/56.02 |
| 8,710,796 | B2 * | 4/2014 | Muller et al. ................ | 320/109 |
| 2004/0130288 | A1 | 7/2004 | Souther et al. | |
| 2012/0119702 | A1 | 5/2012 | Gaul et al. | |

FOREIGN PATENT DOCUMENTS

| | | |
|---|---|---|
| DE | 44 46 406 A1 | 7/1995 |
| DE | 10 2009 034 886 A1 | 2/2011 |
| EP | 0 610 258 B1 | 8/1994 |
| EP | 2 281 711 A2 | 2/2011 |
| WO | WO 98/32209 A1 | 7/1998 |
| WO | WO 2010/060370 A1 | 6/2010 |
| WO | WO 2011/003317 A1 | 1/2011 |

OTHER PUBLICATIONS

International Search Report dated Oct. 25, 2012 with English translation (six (6) pages).
German Search Report dated Feb. 17, 2012 w/ partial English translation (ten (10) pages).
Norm E DIN IEC 62196-2, May 2010, p. 36.
Norm SAE J1772, Jan. 2010, p. 36.

* cited by examiner

VEHICLE CHARGING ARRANGEMENT

CROSS REFERENCE TO RELATED APPLICATIONS

This application is a continuation of PCT International Application No. PCT/EP2012/056411, filed Apr. 10, 2012, which claims priority under 35 U.S.C. §119 from German Patent Application No. DE 102011007839.8, filed Apr. 21, 2011, the entire disclosures of which are expressly incorporated by reference herein.

BACKGROUND AND SUMMARY OF THE INVENTION

The invention relates to a vehicle charging arrangement that includes a charging station outside a vehicle, a charging cable, and an electric charging unit of the vehicle, for charging an electric energy storage device of the vehicle with electric energy from an external alternating-current network.

Types of electric drives, such as hybrid drives or pure electric drives, are becoming increasingly significant for individual short-distance transport. One main component of the electric power train is the electric energy storage device, which usually has an idle state of the potential in the high-voltage range. This energy storage device is also called a high-voltage battery and, in the case of electric vehicles and in the case of plug-in hybrids, can be supplied with electric power from an outside source, in order to be charged. A charging operation can take place conductively, i.e. in a wired manner, or inductively, i.e. in a wireless manner. When the established cable charging techniques are used, the vehicle is connected with a charging station, a charging pole or a wall box by way of a charging cable. European Patent Document EP 0 610 258 B1, for example, describes a charging station which, for charging a battery, supplies a vehicle with an electric direct-current charging unit. On the other hand, Austrian Patent Document AT 507 605 A1 describes an electricity charging station for electric vehicles which provides 1-phase or 3-phase alternating current. In this case, the electric vehicle has to have a charging device in order to be able to charge the battery at the charging station. It is a disadvantage of this state of the art that not every electrified vehicle that has an external charging possibility that is compatible with every charging station or electricity charging station. A multiplicity of charging stations, charging cables, and charging configurations of the vehicles results in losses of comfort for the user because his vehicle can only be recharged at certain charging stations. Vice-versa, it is disadvantageous for the utilization of a charging pole if only vehicles of a certain type can be charged at the charging pole. This may also result in high costs for the user if investments have to be made in the private sphere in the installation of charging technology that was developed and produced specifically for the vehicle.

It is an object of the invention to provide an improved vehicle charging arrangement. According to exemplary embodiments of the invention, the charging station can be supplied on the input side with electric power from the external-alternating current system. At one end, the charging cable is electrically connected with the charging station or can be electrically connected to the charging station and, at the other end, can be electrically connected by way of a plug-and-socket connection to the electric charging unit. The charging station has six electric taps and the charging cable has six electric lines. The six electric taps of the charging station are connected with the six electric lines of the charging cable while having the same configuration. The six electric lines of the charging cable are also connected in the same configuration with at least four electric contacts of the electric charging unit in order to charge the electric energy storage device.

In this document, the term "connection having the same configuration" means that, in the case of such connection, a certain electric tap of the charging station, for example, a first electric tap, or a certain electric contact of the electric charging unit, for example, a first electric contact, is connected with a certain electric line of the charging cable, for example, a first electric line. A connection in the same configuration therefore excludes that, within the scope of an intended use, the electric contacts or the electric taps are connected with the electric lines in a different combination; for example, a second electric tap is connected with a third electric line, or a third electric line is connected with a fourth electric contact.

Exemplary embodiments of the invention therefore make it possible to connect a vehicle to a charging station or a charging pole by way of a charging cable having six wires in order to charge the battery of the vehicle. In this case, the charging pole has six electric taps; the charging cable has six electric wires, and the electric charging unit has at least four electric contacts. Additional electric taps can be provided at the charging station; additional electric wires can be provided in the charging cable; and additional electric contacts can be provided at the electric charging unit, which, within the scope of additional functions, can supplement the actual charging task, i.e. beyond the transfer of electric power, for example, by monitoring the temperature or a contact locking. Analogous to a filling station for gas, the charging arrangement may be considered to be a filling station for current.

It is further advantageous for the charging station to include a first charging control unit which is electrically connected with the first electric tap; for the electric charging unit to include a second charging control unit which is connected with the first electric contact; and, for the charging of the electric energy storage device, for the first electronic charging unit and the second electric charging unit to exchange data by way of the first electric line. The charging station further includes a protective ground conductor that is connected with the second electric tap, and the electric charging unit includes a protective ground conductor that is connected with the second electric contact so that, for charging the electric energy storage device, the second electric line is used as a grounding line.

By the two charging control units, a charging communication is established between the vehicle and the charging station or charging column. By exchanging suitable information, for example, the charging condition of the electric energy accumulator, the charging operation can be regulated and/or controlled. In addition to the charging communication, a charging monitoring and a charging management can be implemented in the charging control units.

It is particularly advantageous for the charging station to have a first ac-to-dc converter, and for the charging station to have a two-position switch having a first switching position and a second switching position, which can be controlled by the first charging control unit. In the first switching position, the first ac-to-dc converter is supplied on the input side from the external alternating-current network, and in the second switching position, the third electric tap is connected with the neutral phase of the external alternating-current network, as well as the fourth electric tap is connected with a conduction phase of the external alternating-current phase.

According to this further development, it becomes possible that the charging station can provide either direct current or alternating current as a function of the switching position of the switch controllable by the first charging control unit.

The external alternating-current network is preferably designed as a 1-phase alternating current network, and the first ac-to-dc converter is preferably designed as a 1 phase ac-to-dc converter. The first 1-phase ac-to-dc converter is connected on the output side with the fifth electric tap and the sixth electric tap.

In this case, a 1-phase alternating current is provided by the charging station in the second switching position.

As a alternative, the external alternating-current network may be designed as an external 3-phase alternating-current network, and the first ac-to-dc converter may be designed as a 3-phase ac-to-dc converter. The first 3-phase ac-to-dc converter is connected on the output side by way of a first switch system with the fifth electric tap and the sixth electric tap, and in the second switching position, the fifth electric tap and the sixth electric tap are each connected with a conduction phase of the external 3-phase alternating-current network.

Here, a 3-phase alternating current is provided by the charging station in the second switching position.

Advantageously, the electric charging unit has a 1-phase charging device which, on the input side, is connected with the third electric contact and the fourth electric contact and, on the output side, is connected with the electric energy storage device. The switch can be switched to the second switching position in order to charge the electric energy storage device.

In this manner, the battery of a vehicle can be charged by a 1-phase charging device at a charging station which provides 1-phase or 3-phase alternating current. If a three-phase alternating current is provided, 2 phases will remain unutilized.

As an alternative, the electric charging unit may have a 3-phase charging device which, on the input side, is connected with the third electric contact, the fourth electric contact, the fifth electric contact, and the sixth electric contact, and on the output side, is connected with the electric energy storage device. The switch can be switched to the second switching position in order to charge the electric energy storage device.

In this case, the high-voltage battery of a vehicle, which is equipped with a 3-phase charging device, can be charged at a charging station which provides 1-phase or 3-phase alternating current. If only 1-phase current is available, two phase inputs of the 3-phase charging device will be without power.

A further variant of the present invention is formed in the case of a 1-phase external alternating-current network and in the case of a charging station having a switch as described above and a 1-phase ac-to-dc converter which is connected on the output side with the fifth electric tap and the sixth electric tap, when the electric charging unit has a second switch system which connects the fifth electric contact and the sixth electric contact with the electric energy storage device. The switch can be switched to the first switching position, and the second switch system can be closed in order to charge the electric energy storage device.

As a result, it becomes possible to close the second switch system for the charging and to switch the switch of the charging station to the first switching position. The electric charging unit of the vehicle is thereby supplied with direct current from the charging station.

When the external alternating-current network and the charging station have a switch as described above and a 3-phase ac-to-dc converter, which is connected on the output side by way of a first switch system with the fifth and the sixth electric tap, and when, in the second switching position, the fifth and the sixth electric tap are in each case connected with a conduction phase of the external alternating-current network, an advantageous embodiment of the present invention is further obtained when the electric charging unit has a second switch system which connects the fifth electric contact and the sixth electric contact with the electric energy storage device. In this embodiment, the switch can be switched to the first switching position, and the first switch system and the second switch system can be closed in order to charge the electric energy storage device.

This embodiment makes it possible to charge the electric energy storage device of a vehicle having a correspondingly designed electric charging unit with direct current.

If the charging station has a switch as described above and a 1-phase ac-to-dc converter, which on the output side is connected with the fifth and the sixth electric tap, an advantageous further development is obtained when the electric charging unit has a 1-phase charging device which is connected on the input side with the third electric contact and the fourth electric contact and is connected on the output side with the electric energy storage device. The electric charging unit further has a second switch system which connects the fifth electric contact and the sixth electric contact with the electric energy storage device. The switch can be switched to the first switching position, and the second switch system can be closed in order to charge the electric energy storage device. As an alternative, the switch is switched to the second switching position, and the second switch system is opened in order to charge the electric energy storage device.

A vehicle having a correspondingly designed electric charging unit can therefore be charged optionally with alternating current or with direct current at a charging station that is supplied from a 1-phase alternating-current network.

If the charging station has a switch as described above and a 3-phase ac-to-dc converter, which is connected on the output side with the third and fourth electric tap and is connected by way of a first switch system with the fifth and the sixth electric tap, the electric charging unit may also have a 1-phase charging device which is connected on the input side with the third electric contact and the fourth electric contact and is connected on the output side with the electric energy storage device. In addition, the electric charging unit has a second switch system which connects the fifth electric contact and the sixth electric contact with the electric energy storage device. The switch is switched to the first switching position, and the first and the second switch systems are closed in order to charge the electric energy storage device. As an alternative, the switch is switched to the second switching position and the second switch system is opened in order to charge the electric energy storage device.

A vehicle having a correspondingly designed electric charging unit can therefore be optionally supplied with alternating current or with direct current at a charging station that is supplied from a 3-phase alternating-current network.

If the charging station has a switch and a 1-phase ac-to-dc converter, which is connected on the output side with the fifth and the sixth electric tap, according to a further embodiment, the electric charging unit has a 3-phase charging device and a second switch system. In this case, the 3-phase charging device is connected on the input side with the third electric contact and with the fourth electric contact, and is connected by way of the second switch system with the fifth electric contact and the sixth electric contact. On the output side, the 3-phase charging device is connected with the electric energy storage device. In addition, the electric charging unit has a third switch system which connects the fifth electric contact and the sixth electric contact with the electric energy storage device. The switch is switched to the first switching position, the second switch system is opened, and the third switch system is closed in order to charge the electric energy storage device. As an alternative, the switch is switched to the second switching position in order to charge the electric energy storage device.

A vehicle having a correspondingly further developed electric charging unit, particularly having a 1-phase charging device, can therefore be optionally supplied with alternating current or with direct current at a charging station that is supplied from a 1-phase alternating-current network.

If the charging station has a switch as described above and a 3-phase ac-to-dc converter, which is connected at the output side with the third and fourth electric tap and by way of a first switch system is connected with the fifth and the sixth electric tap, a further embodiment will be particularly advantageous. Accordingly, the electric charging unit has a 3-phase charging device and a second switch system. The 3-phase charging device is connected at the input side with the third and the fourth electric contact, as well as by way of the second switch system with the fifth electric contact and the sixth electric contact. At the output side, it is connected with the electric energy storage device. Furthermore, the electric charging unit has a third switch system which connects the fifth electric contact and the sixth electric contact with the electric energy storage device. The switch is switched to the first switching position, the second switch system is opened, and the first and third switching systems are closed in order to charge the electric energy storage device. As an alternative, the switch is switched to the second switching position, the second switch system is closed, and the third switch system is opened in order to charge the electric energy storage device.

A vehicle having a correspondingly further developed electric charging unit, particularly having a 3-phase charging device, can therefore be optionally supplied with alternating current or with direct current at a charging station supplied from a 3-phase alternating-current network.

Exemplary embodiments of the invention are based on the considerations described in the following.

Various conductive, i.e. wired, charging technologies exist for electric vehicles and hybrid vehicles. One technology is charging with alternating current (ac-charging), in which case the charging device is situated in the vehicle. Another technology is charging with direct current (dc-charging), in which case a charging device is situated in the charging station. Dc-charging is frequently also called rapid charging because, in the case of this charging technology, the charging power is normally higher. According to the related art, one charging cable and one charging plug respectively are required for both charging technologies. Currently, a novel plug system, which is called a combo plug system, is being standardized; see Standards SAE J2847-2 and IEC 61851-23. The plug system includes a single charging socket at the vehicle having a single plug which is connected to the vehicle socket. This is independent of whether the vehicle can basically be supplied with alternating current and/or with direct current. A vehicle having such a plug system can therefore, if the additional electric charging unit is correspondingly designed, be charged at an ac-charging pole or an ac-wall box as well as at a dc-charging station.

The charging plug, also called a coupler, is fixedly connected with the charging station by way of the charging cable during the dc-charging. Diverse lines for the power transmission and for the communication between the vehicle and the charging source extend in the charging cable.

Within the scope of the current state of development, it is a disadvantage that vehicles which only have an ac-charging architecture cannot be charged at dc-charging poles. The "number of customers" of dc-charging poles is also considerably limited. In addition, technical misunderstandings and losses of comfort are caused on the part of the user because, when the described plug system is used, although the vehicle can be connected to the charging station by way of the charging cable, as a function of the charging architecture of the vehicle and the layout of the charging station, under certain circumstances, no charging possibility may exist, for example, when a vehicle with an ac-charging structure is attached to a dc-charging pole.

A combined ac-to-dc charging station is suggested for solving this problem. The latter recognizes as a result of a communication with the vehicle whether a vehicle is involved which can be charged with direct current. If it is a vehicle which can only be charged with alternating current, or where there is a disturbance during the charging with direct current, the charging station will switch to ac-charging internally by a change-over switch. In this case, alternating current is transferred from the alternating-current source to the vehicle by way of ac-lines which may also be used as dc-lines during the dc-charging. In the vehicle, the alternating current is converted to direct current in the charging device. The battery is charged with direct current or other electric consuming devices in the vehicle are supplied. If a vehicle is involved that is dc-chargeable, the charging station will internally change to charging with direct current by the change-over switch. The alternating current of the alternating-current source is converted in the ac-to-dc converter of the charging station to direct current which is transmitted by way of dc-lines to the vehicle. For the dc-charging, feasible contactors have to be closed on both sides, in which case contactors of the charging station may also be replaced by diodes. The battery is charged by the direct current, or other electric consuming devices in the vehicle are supplied.

Summarizing, exemplary embodiments of the invention include a charging station which permits an ac- or dc-charging as a function of the connected vehicle. In this case, the same cable type and the same plug-and-socket system are used for the charging station and the vehicle in the case of both charging possibilities.

It is advantageous that the functionality of dc-charging stations is expanded and the total number of required charging stations is reduced. Cost reduction potentials are a result of the fact that no different plug-and-socket systems have to be provided for alternating-current charging and direct-current charging. The user profits from a simple operability because such a combined ac-dc charging station always offers a charging possibility irrespective of the technical further development of the charging architecture of the user's vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Independently of the number of the figure, the reference numbers are contained in the list of reference symbols. In the following, individual reference numbers may describe a detailing of a technical object that deviates depending on the figure. For example, reference number 29 according to the list of reference symbols relates to a charging device in FIG. 4 and FIG. 5, which charging device is further characterized in FIG. 4 as a 1-phase charging device and in FIG. 5 is further characterized as a 3-phase charging device. Because both charging devices are each a component of an electric charging unit that differs specifically in this point, the separate reference numbers 420 and 520 are introduced.

Figure 1:
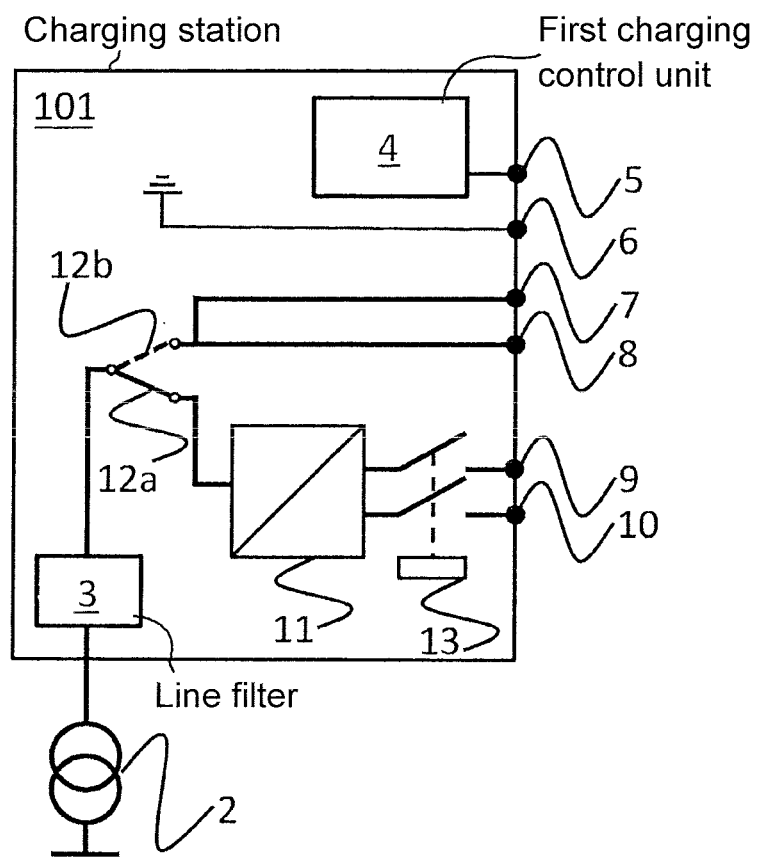
FIG. 1 is a schematic view of a charging station having a 1-phase external alternating-current network.

FIG. 1 illustrates a charging station 101 which is supplied by an external alternating-current network 2 which has a 1-phase design. A line filter 3 or grid or grid filter can be used for smoothing the electric power. The charging station has a first charging control unit 4 and a first ac-to-dc converter 11. The charging station has six electric taps 5-10 toward the exterior. The first electric tap 5 is connected with the charging control unit. The second electric tap 6 is connected with a ground protection line. The charging station has a two-position switch which supplies the ac-to-dc converter with electric power in the first switching position 12a. A first switch system 13 is connected behind the output of the ac-to-dc converter, which first switch system 13 connects the output with the fifth electric tap 9 and the sixth electric tap 10. The fifth electric tap is situated on the positive direct-current potential, and the sixth electric tap is situated on the negative direct-current potential. In the second switching position 12b, the switch connects the neutral phase of the external alternating-current network with the third electric tap 7 and the conduction phase with the fourth electric tap 8. Such a charging station may be installed as a charging pole in a public space or as a so-called wall box on a private house connection.

Figure 2:
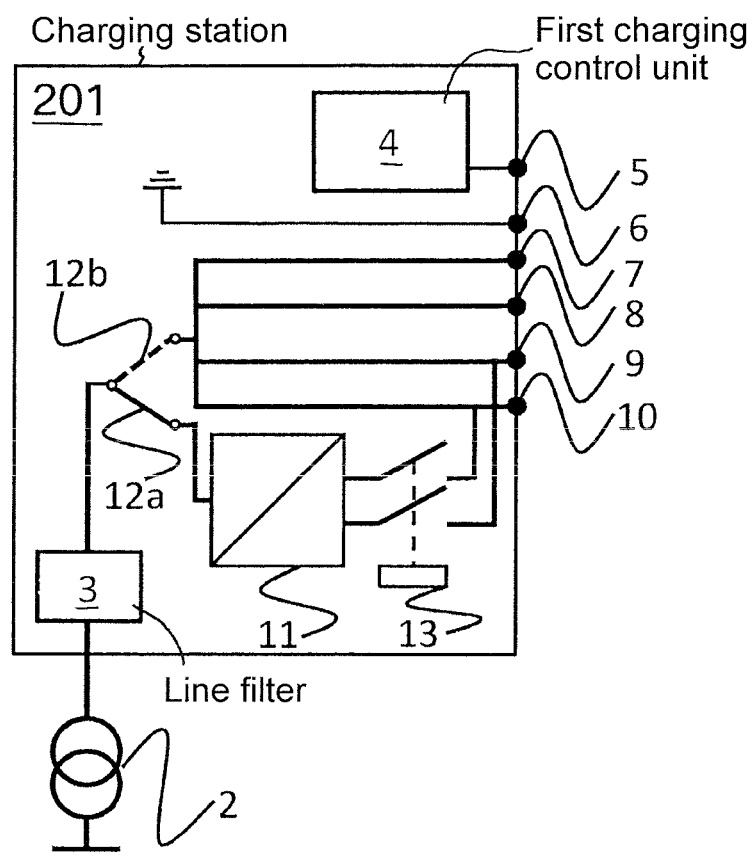
FIG. 2 is a schematic view of a charging station having a 3-phase external alternating-current network.

FIG. 2 illustrates a charging station 201 which is supplied by an external alternating-current network 2, which has a 3-phase construction. For smoothing the electric power, a line filter 3 or grid filter can be used. The charging station has a first charging control unit 4 and a first ac-to-dc converter 11. The charging station has six electric taps 5-10 toward the exterior. The first electric tap 5 is connected with the charging control unit. The second electric tap 6 is connected with a ground protection line. The charging station has a two-position switch which, in the first switching position 12a, supplies the ac-to-dc converter with electric power. A first switch system 13 is connected behind the output of the ac-to-dc converter and connects the output with the fifth electric tap 9 and the sixth electric tap 10. The fifth electric tap is situated on the positive direct-current potential and the sixth electric tap is situated on the negative direct-current potential. In the second switching position 12b, the switch connects the neutral phase of the external alternating-current network with the third electric tap 7, a conduction phase of the external alternating-current network with the fourth electric tap 8, and the two further conduction phases of the external alternating current network with the fifth 9 and the sixth 10 electric tap. Such a charging station can be installed as a charging pole in a public space or as a wall box on a private house connection.

Figure 3:
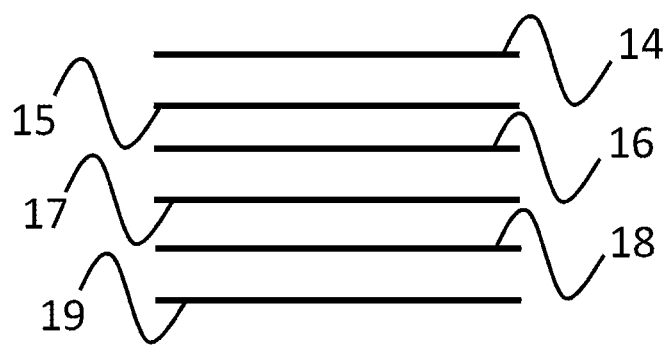
FIG. 3 is a schematic view of a charging cable.

FIG. 3 illustrates a charging cable having six electric lines 14-19. The charging cable can be fixedly connected with the charging station of FIG. 1 or with the charging station of FIG. 2, or can be reversibly connected. In this case, it is significant that a correct connection will exist only if the electric taps of the charging station are connected in the same configuration with the six electric lines of the charging cable. This means that the first electric tap 5 is connected with the first electric line 14; the second electric tap 6 is connected with the second electric line 15; the third electric tap 7 is connected with the third electric line 16, the fourth electric tap 8 is connected with the fourth electric line 17; the fifth electric tap 9 is connected with the fifth electric line 18; and the sixth electric tap 10 is connected with the sixth electric line 19. At the two ends, the cable may in each case have a plug or a part of a plug system, which ensures the compatibility of the respective end either with a socket on the vehicle or the charging station. The end of the charging cable assigned to the vehicle may also have a plug which is further developed such that one pin respectively in the plug is assigned to the six electric lines, and an additional seventh pin situated in the plug is connected by way of a passive electric circuit arranged in the plug housing with the second electric line or the second electric pin. The seventh pin is called proxy-pin.

Figure 4:
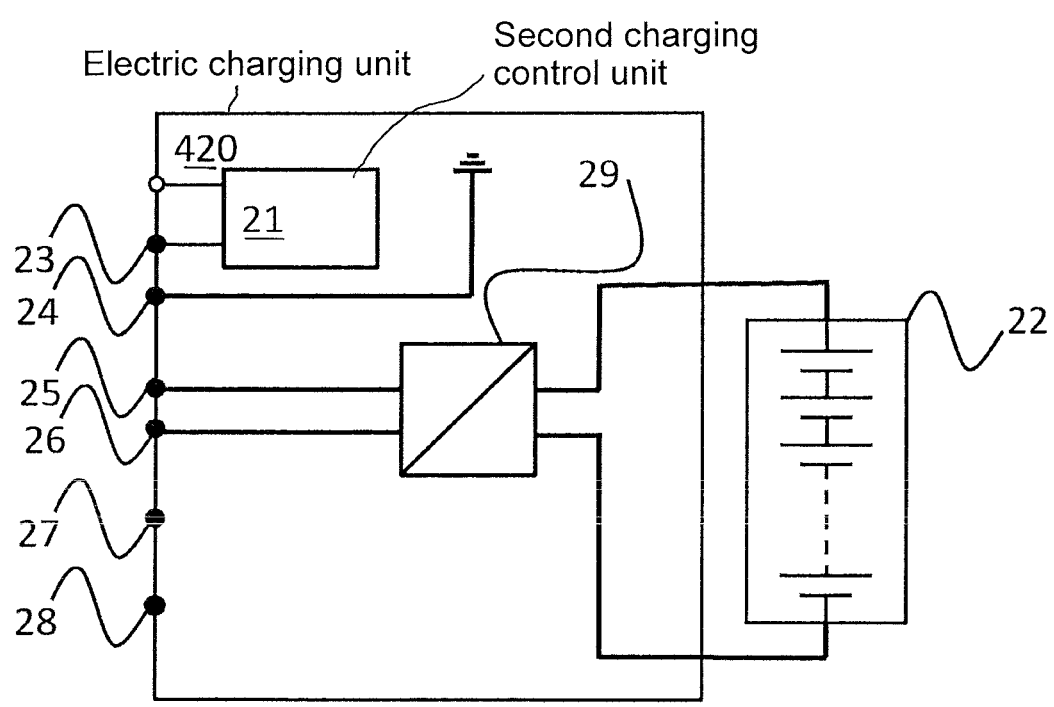
FIG. 4 is a schematic view of an electric charging unit for alternating-current charging having a 1-phase charging device.
Figure 5:
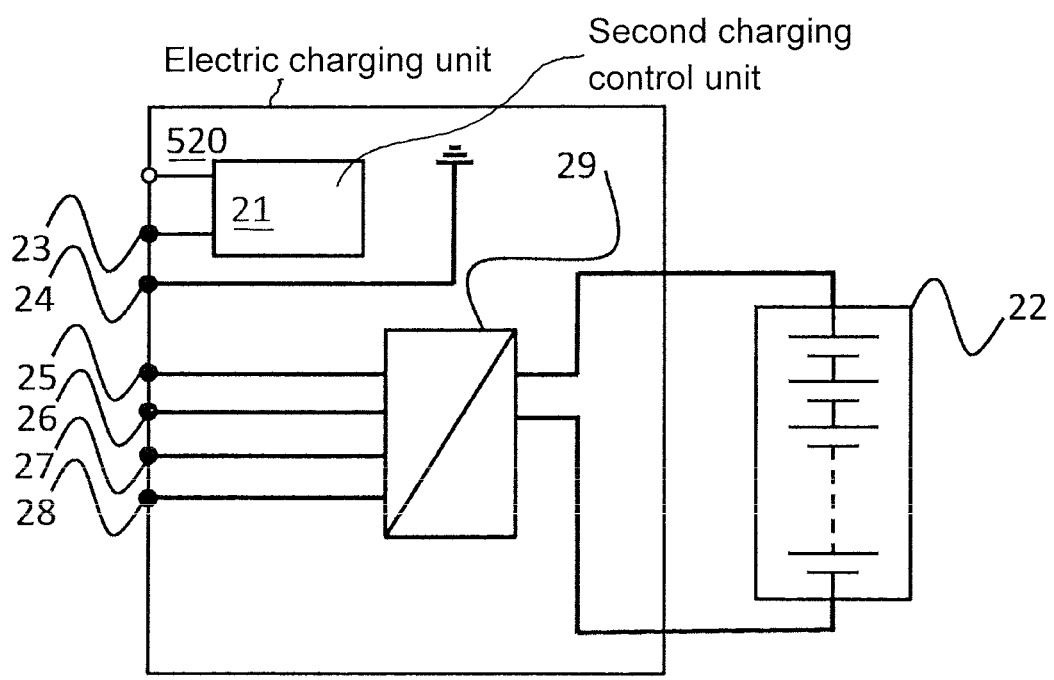
FIG. 5 is a schematic view of an electric charging unit for alternating-current charging having a 3-phase charging device.

FIG. 4 illustrates the electric charging unit 420 of a vehicle. The vehicle has an electric energy storage device 22. The electric charging unit has a second charging control unit 21 and a socket to which the charging cable described in FIG. 3 can be connected. The socket is preferably mounted at the vehicle body shell in an easily accessible manner. The socket has six electric contacts with which the six electric lines of the charging cable are connected in the same configuration. This means that, in the case of the same configuration, the first electric line 14 is connected with the first electric contact 23; the second electric line 15 is connected with the second electric contact 24; the third electric line 16 is connected with the third electric contact 25; the fourth electric line 17 is connected with the fourth electric contact 26; the fifth electric line 18 is connected with the fifth electric contact 27; and the sixth electric line 19 is connected with the sixth electric contact 28. The second charging control unit is connected with the first electric contact 23. The second charging control unit may, in addition, be connected with a further seventh contact in the socket, which is called a proximity contact or proxy contact. The second electric contact 24 is connected with a grounding protection line. In addition, the electric charging unit is connected with an ac-to-dc converter 29 which operates as the charging device. On the input side, the charging device is designed for 1-phase alternating current, the input for the neutral phase being connected with the third electric contact 25 and the input for the conduction phase being connected with the fourth electric contact 26. On the output side, it supplies the electric energy storage device with charging current. The fifth electric contact 27 and the sixth electric contact 28 are not in functional connection with the flow of electric charging power into the electronic charging unit for charging the electric energy storage device.

FIG. 5 illustrates the electric charging unit 520 of a vehicle. The vehicle has one electric energy storage device 22. The electric charging unit has a second charging control unit 21 and a socket to which the charging cable described in FIG. 3 can be connected. The socket is preferably mounted on the outer shell of the vehicle in an easily accessible manner. The socket has six electric contacts with which the six electric lines of the charging cable can be connected in the same configuration. This means that, in the case of the same configuration, the first electric line 14 is connected with the first electric contact 23; the second electric line 15 is connected with the second electric contact 24; the third electric line 16 is connected with the third electric contact 25; the fourth electric line 17 is connected with the fourth electric contact 26; the fifth electric line 18 is connected with the fifth electric contact 27; and the sixth electric line 19 is connected with the sixth electric contact 28. The second charging control unit is connected with the first electric contact 23. The second charging control unit may, in addition, be connected with a further seventh contact in the socket, which is called a proximity contact or proxy contact. The second electric contact 24 is connected with a grounding protection line. In addition, the electric charging unit is connected with an ac-to-dc converter 29 which operates as the charging device. On the input side, the charging device is designed for 3-phase alternating current, the input for the neutral phase being connected with the third electric contact 25 and the inputs for the conduction phases being connected with the fourth electric contact 26, the fifth electric contact 27 and the sixth electric contact 28. On the output side, it supplies the electric energy storage device with charging current.

Figure 6:
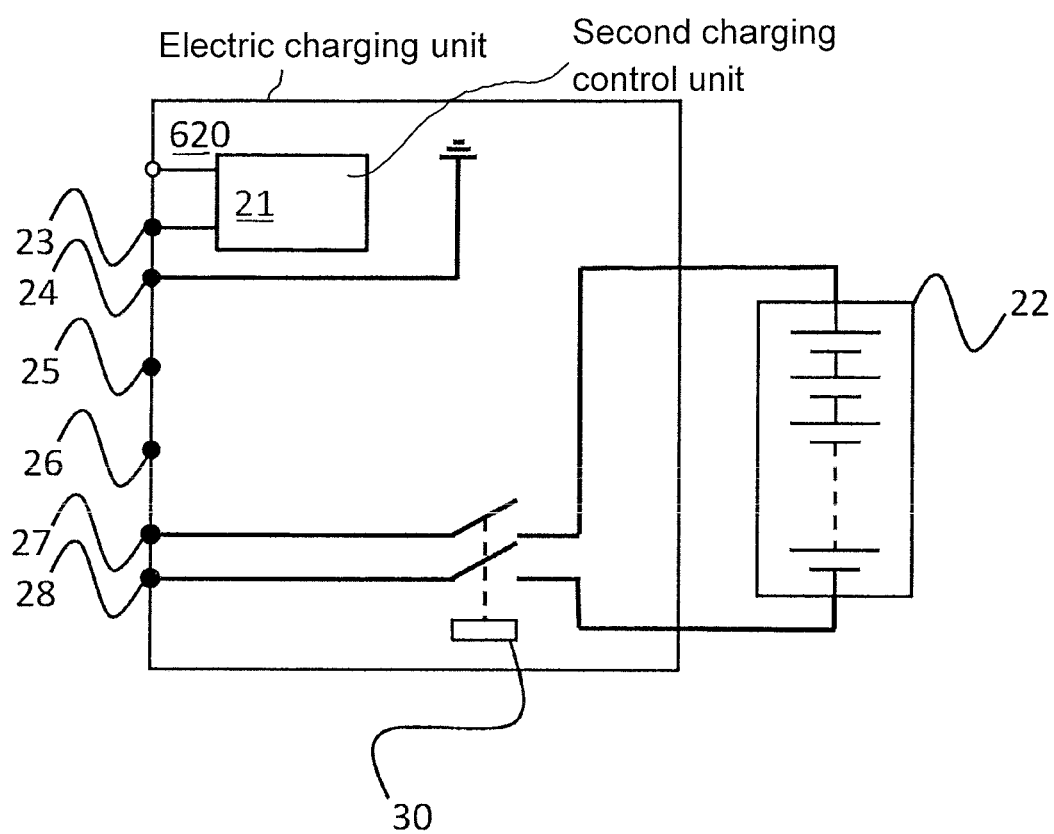
FIG. 6 is a schematic view of an electric charging unit for direct-current charging.

FIG. 6 illustrates the electric charging unit 620 of a vehicle. The vehicle has one electric energy storage device 22. The electric charging unit has a second charging control unit 21 and a socket to which the charging cable described in FIG. 3 can be connected. The socket is preferably mounted at the vehicle body shell in an easily accessible manner. The socket has six electric contacts with which the six electric lines of the charging cable are connected in the same configuration. This means that, in the case of the same configuration, the first electric line 14 is connected with the first electric contact 23; the second electric line 15 is connected with the second electric contact 24; the third electric line 16 is connected with the third electric contact 25; the fourth electric line 17 is connected with the fourth electric contact 26; the fifth electric line 18 is connected with the fifth electric contact 27; and the sixth electric line 19 is connected with the sixth electric contact 28. The second charging control unit is connected with the first electric contact 23. The second charging control unit may, in addition, be connected with a further seventh contact in the socket, which is called a proximity contact or proxy contact. The second electric contact 24 is connected with a grounding protection line. In addition, the electric charging unit is equipped with a second switch system 30.

In the open switching position, the second switch system separates the electric energy storage device from the fifth electric contact 27 and from the sixth electric contact 28. In the closed switching position, the fifth electric contact is connected with the positive potential of the electric energy storage device, and the sixth electric contact is connected with the negative potential of the electric storage device. The third electric contact 25 and the fourth electric contact 27 are not in functional connection with the flow of electric charging power into the electric charging unit for charging the electric energy storage device.

Figure 7:
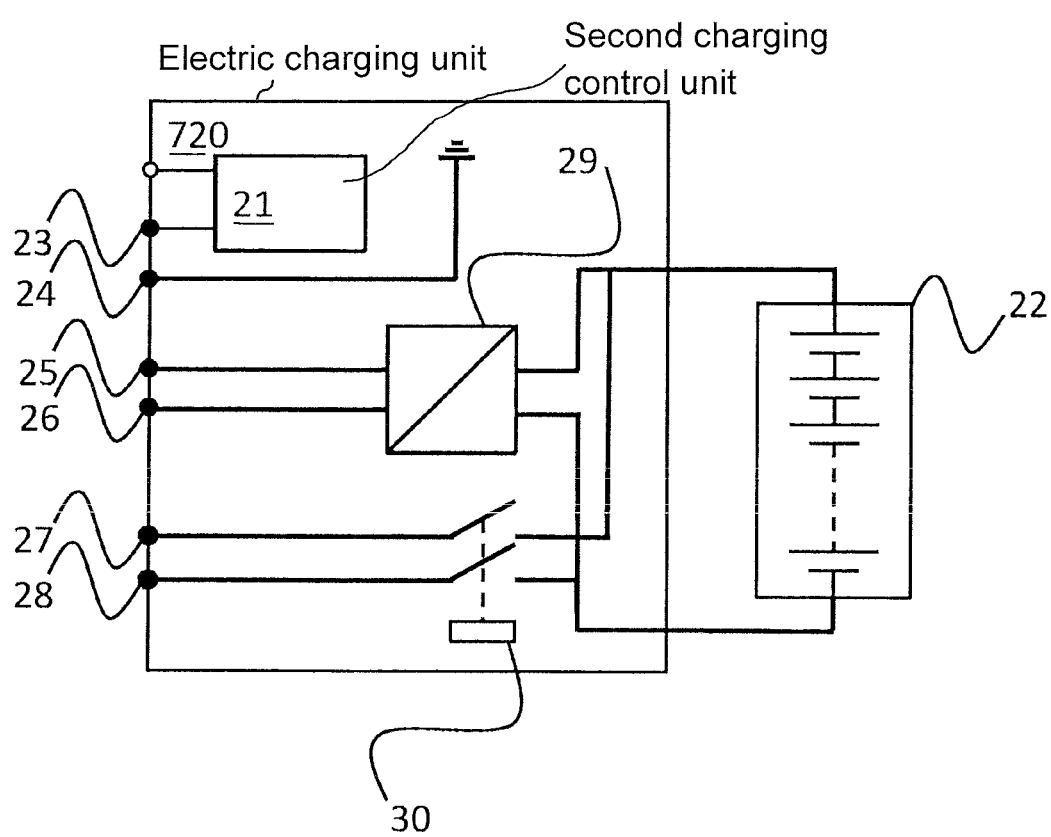
FIG. 7 is a schematic view of an electric charging unit for alternating-current charging having a 1-phase charging device and for direct-current charging.

FIG. 7 illustrates the electric charging unit 720 of a vehicle. The vehicle has one electric energy storage device 22. The electric charging unit has a second charging control unit 21 and a socket to which the charging cable described in FIG. 3 can be connected. The socket is preferably mounted at the vehicle body shell in an easily accessible manner. The socket has six electric contacts with which the six electric lines of the charging cable are connected in the same configuration. This means that, in the case of the same configuration, the first electric line 14 is connected with the first electric contact 23; the second electric line 15 is connected with the second electric contact 24; the third electric line 16 is connected with the third electric contact 25; the fourth electric line 17 is connected with the fourth electric contact 26; the fifth electric line 18 is connected with the fifth electric contact 27; and the sixth electric line 19 is connected with the sixth electric contact 28. The second charging control unit is connected with the first electric contact 23. The second charging control unit may, in addition, be connected with a further seventh electric contact in the socket, which is called a proximity contact or proxy contact. The second electric contact 24 is connected with a grounding protection line. In addition the electric charging unit is equipped with an ac-to-dc converter 29, which operates as the charging device. On the input side, the charging device is designed for 1-phase alternating current, the input for the neutral phase being connected with the third electric contact 25 and the input for the conduction phase being connected with the fourth electric contact 26. On the output side, it supplies the electric energy storage device with charging current. In addition, the electric charging unit is equipped with a second switch system 30. In the open switching position, the second switch system separates the electric energy storage device from the fifth electric contact 27 and from the sixth electric contact 28. In the closed switching position, the fifth electric contact is connected with the positive potential of the electric energy storage device, and the sixth electric contact is connected with the negative potential of the electric storage device.

Figure 8:
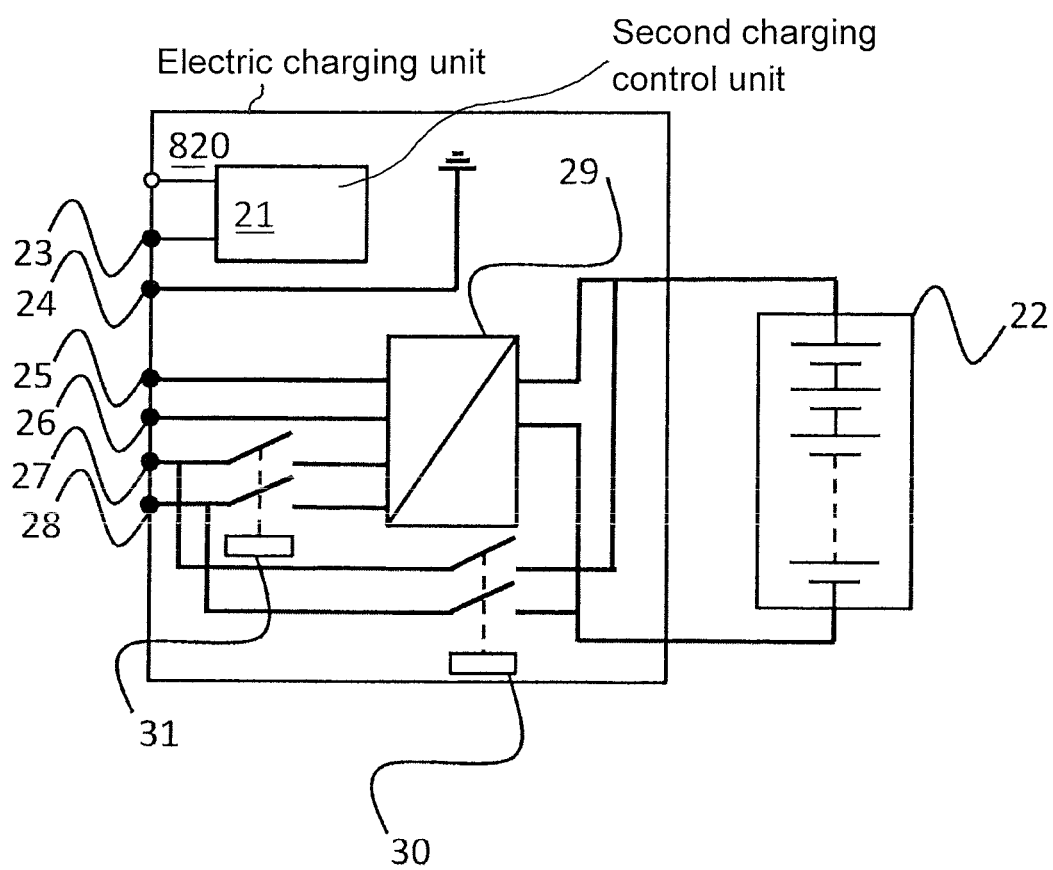
FIG. 8 is a schematic view of an electric charging unit for alternating-current charging having a 3-phase charging device and for direct-current charging.

FIG. 8 illustrates the electric charging unit 820 of a vehicle. The vehicle has one electric energy storage device 22. The electric charging unit has a second charging control unit 21 and a socket to which the charging cable described in FIG. 3 can be connected. The socket is preferably mounted at the vehicle body shell in an easily accessible manner. The socket has six electric contacts with which the six electric lines of the charging cable are connected in the same configuration. This means that, in the case of the same configuration, the first electric line 14 is connected with the first electric contact 23; the second electric line 15 is connected with the second electric contact 24; the third electric line 16 is connected with the third electric contact 25; the fourth electric line 17 is connected with the fourth electric contact 26; the fifth electric line 18 is connected with the fifth electric contact 27; and the sixth electric line 19 is connected with the sixth electric contact 28. The second charging control unit is connected with the first electric contact 23. The second charging control unit may, in addition, be connected with a further seventh electric contact in the socket, which is called a proximity contact or proxy contact. The second electric contact 24 is connected with a grounding protection line. In addition, the electric charging unit is equipped with a second switch system 30. In the open switching position, the second switch system separates the electric energy storage device from the fifth electric contact 27 and from the sixth electric contact 28. In the closed switching position, the fifth electric contact is connected with the positive potential of the electric energy storage device, and the sixth electric contact is connected with the negative potential of the electric storage device. In addition, the electric charging unit is equipped with an ac-to-dc converter 29, which operates as the charging device. On the input side, the charging device is designed for 3-phase alternating current, the input for the neutral phase being connected with the third electric contact 25 and an input for the conduction phase being connected with the fourth electric contact 26. The two additional conduction phase inputs of the charging device are connected by way of a third switch system with the fifth electric contact 27 and the sixth electric contact 28. In the open switch position of the third switch system, the charging device can be supplied with electric power by way of the one conduction phase input at the fourth electric contact; when the third switch system is closed, all three conduction phase inputs can be supplied with electric power. On the output side, the charging device supplies the electric energy storage devices with direct current.

In order to charge the electric energy storage device of the vehicle, the vehicle is connected according to one of FIG. 4, 5, 6, 7 or 8 by way of the charging cable according to FIG. 3 with a charging station according to one of FIG. 1 or 2. A correct and intended connection requires a connection in the configuration in accordance with this description. This means that the first electric tap 5 is connected with the first electric line 14; the second electric tap 6 is connected with the second electric line 15; the third electric tap 7 is connected with the third electric line 16; the fourth electric tap 8 is connected with the fourth electric line 17; the fifth electric tap 9 is connected with the fifth electric line 18; and the sixth electric tap 10 is connected with the sixth electric line 19; and that the first electric line 14 is connected with the first electric contact 23; the second electric line 15 is connected with the second electric contact 24; the third electric line 16 is connected with the third electric contact 25; the fourth electric line 17 is connected with the fourth electric contact 26; the fifth electric line 18 is connected with the fifth electric contact 27; and the sixth electric line 19 is connected with the sixth electric contact 28. If the electric charging unit of the vehicle, by way of a proxy contact and the charging cable, has a proxy pin at the end assigned to the vehicle, in the case of a connection with the same configuration, the seventh contact and the seventh pin are also connected with one another. In this case, the second charging control unit of the vehicle is connected with the electric circuit which mutually connects the seventh electric pin of the plug of the charging cable with the second electric pin of the charging cable. By an electric potential applied at the output of the second charging control unit, which is connected with the seventh electric contact, it can be detected whether a correct plug-and-socket connection is present. In the case of such a connection, for example, the potential at the seventh electric contact, because of the current flow through the electric circuit which connects the seventh electric pin with the second electric pin, is lower than the electric potential applied at the output of the second charging control unit, if the electric circuit is constructed according to the principle of a voltage divider. Within the scope of the connection of the same configuration, the two charging control units are mutually connected by way of the first electric line in order to exchange data bidirectionally. The data exchange may be based, for example, on a communication by amplitude modulation of a pulse-width-modulated signal. A so-called power line communication can also be implemented. The communication is the basis of a charging management, i.e., the controlling, regulating and monitoring of the charging operation. This includes the regulating of the first ac-to-dc converter and the controlling of the two-position switch and of the first switch system by the first charging control unit, as well as the regulating of the second ac-to-dc converter and the controlling of the second and third switch system by the second charging control unit. The charging management is usually implemented in the form of software in the two charging control units but will not be considered in detail within the scope of the present document. In the charging management, the sequence of a charging operation and the specific charging method, i.e. the battery charging voltage and the battery charging current, are imaged as a function of various parameters, such as the battery charging state, the battery temperature, etc.

At a charging station according to FIG. 1, a vehicle according to FIG. 4 can be charged by a charging cable according to FIG. 3. The first charging control unit 4 adjusts the two-position switch of the charging station to the second switching position 12*b*. By way of the third electric line 16 and the fourth electric line 17, the 1-phase charging device 29 is fed with alternating current (alternating-current charging), which supplies the battery with direct charging current.

At a charging station according to FIG. 1, a vehicle according to FIG. 5 can be charged by a charging cable according to FIG. 3. The first charging control unit 4 adjusts the two-position switch of the charging station to the second switching position 12*b*. By way of the third electric line 16 and the fourth electric line 17, the 3-phase charging device 29 is supplied with alternating current (alternating-current charging), which supplies the battery with direct charging current. Two phase inputs at the 3-phase charging device, i.e. the input connected with the fifth 27 and the input connected with the sixth 28 electric contact take in no electric power during the alternating-current charging with 1-phase alternating current.

At the charging station according to FIG. 1, a vehicle according to FIG. 6 can be charged by a charging cable according to FIG. 3. The first charging control unit 4 adjusts the two-position switch of the charging station to the first switching position 12*a* and closes the first switch system 13. The second charging control unit 21 closes the second switch system 30. By way of the fifth 18 and the sixth electric line 19, the electric charging unit is supplied with direct current (direct current charging) and the battery is charged.

At a charging station according to FIG. 1, a vehicle according to FIG. 7 can be charged by a charging cable according to FIG. 3. The first charging control unit 4 adjusts the two-position switch to the first switching position 12*a* and closes the first switch system 13 in order to supply the electric charging unit of the vehicle with direct current (direct-current charging). The second charging control unit 21 closes the second switch system 30 so that the battery is charged. The first charging control unit adjusts the two-position switch of the charging station to the second switching position 12*b* in order to supply the electric charging unit of the vehicle with alternating current (alternating-current charging). By way of the third 16 and the fourth electric line 17, the 1-phase charging device is supplied with alternating current, which supplies the battery with direct charging current. The position of the second witch system is without significance in the case of an alternating-current charging. Summarizing, a vehicle according to FIG. 7 can be supplied with alternating current or direct current at a charging station according to FIG. 1.

At a charging station according to FIG. 1, a vehicle according to FIG. 8 can be charged by a charging cable according to FIG. 3. The first charging control unit 4 adjusts the two-position switch to the first switching position 12*a* and closes the first switch system 30 in order to supply the electric charging unit of the vehicle with direct current (direct-current charging). The second charging control unit 21 closes the second switch system 30 and opens the third switch system 31. As a result, the battery is charged by way of the fifth 18 and sixth electric line 19. The 3-phase charging device 29 is uncoupled from the first and sixth electric line by way of which in each case electric power in the form of direct current is transferred. The first charging control unit adjusts the two-position switch of the charging station to the second switching position 12*b* in order to supply the electric charging unit of the vehicle with alternating current (alternating current charging). By way of the third electric line 16 and the fourth electric line 17, the 3-phase charging device is supplied with alternating current, which supplies the battery with direct charging current. Two phase inputs at the 3-phase charging device, i.e. the input connected with the fifth 27 and with the sixth 28 electric contact, take in no electric power during the alternating-current charging with 1-phase alternating current. The positions of the second and the third switch system are without any significance in the case of the alternating-current charging. Summarizing, a vehicle according to FIG. 8 can be charged at a charging station according to FIG. 1 with alternating current or direct current.

At a charging station according to FIG. 2, a vehicle according to FIG. 4 can be charged by a charging cable according to FIG. 3. The first charging control unit 4 adjusts the two-position switch of the charging station to the second shifting position 12*b*. By way of the third electric line 16, the fourth electric line 17, the fifth electric line 18, and the sixth electric line 19, the 3-phase charging device 29 is supplied, which supplies the battery with direct charging current. Although the fifth and the sixth electric line are in each case energized as opposed to the third electric line, no electric power is taken in by the electric charging unit.

At a charging station according to FIG. 2, a vehicle according to FIG. 5 can be charged by a charging cable according to FIG. 3. The first charging control unit 4 adjusts the two-position switch of the charging station to the second switching position 12*b*. By way of the third electric line 16, the fourth electric line 17, the fifth electric line 18, and the sixth electric line 19, the 3-phase charging device is supplied, which supplies the battery with direct charging current.

At a charging station according to FIG. 2, a vehicle according to FIG. 6 is charged by a charging cable according to FIG. 3. The first charging control unit 4 adjusts the two-position switch of the charging station to the first switching position 12*a* and closes the first switch system 13; the second charging control unit 21 closes the second switch system 30. By way of the third 16 and the fourth electric line 17, the electric charging unit is supplied with direct current and the battery is charged.

At a charging station according to FIG. 2, a vehicle according to FIG. 7 can be charged by a charging cable according to FIG. 3. The first charging control unit 4 adjusts the two-position switch to the first switching position 12*a* and closes the first switch system 13 in order to supply the electric charging unit of the vehicle with direct current (direct-current charging). The second charging control unit 21 closes the second switch system 30, so that the battery is charged. The first charging control unit adjusts the two-position switch of the charging station to the second switching position 12*b* in order to supply the electric charging unit of the vehicle with alternating current (alternating-current charging). In this case, the second charging control unit opens the second switch system so that the 1-phase charging device 29 is supplied with alternating current by way of the third electric line 16 and the fourth electric line 17. Although the fifth electric line 18 and the sixth electric line 19 are in each case energized as opposed to the third electric line, no electric power is taken in by the electric charging unit. The charging device supplies the battery with direct charging current. Summarizing, a vehicle according to FIG. 7 can be charged at a charging station according to FIG. 1 with alternating current or direct current.

At a charging station according to FIG. 2, a vehicle according to FIG. 8 can be charged by a charging cable according to FIG. 3. The first charging control unit 4 adjusts the two-position switch to the first switching position 12*a* in order to supply the electric charging unit of the vehicle with direct current (direct-current charging). The second charging control unit 21 closes the second witch system 30 and opens the third switch system 31. The battery is thereby charged by way of the fifth electric line 18 and the sixth electric line 19. The 3-phase charging device 29 is uncoupled from the fifth electric line 18 and the sixth electric line 19 by way of which, in each case, electric power is transferred in the form of direct current. The first charging control unit adjusts the two-position switch of the charging station to the second switching position 12*a* in order to supply the electric charging unit of the vehicle with alternating current (alternating-current charging). During the alternating-current charging, the second charging control unit opens the second switch system and closes the third switch system 31. As a result, the 3-phase charging device is supplied with alternating current by way of the third electric line 16, the fourth electric line 17, the fifth electric line 18, and the sixth electric line 19, which supplies the battery with direct charging current. The battery is uncoupled from the fifth electric line 18 and the sixth electric line 19, which each transfer electric power in the form of alternating current. Summarizing, a vehicle according to FIG. 8 can be charged with alternating current or direct current at a charging station according to FIG. 2.

From a technical point of view, all ten described combinations of vehicles and charging stations for charging an electric energy storage device of an automobile have in common that the same plug-and-socket connection and the same charging cable is used, independently of the available external alternating-current network 2. If, depending on the available alternating-current network, the distribution of charging stations according to FIG. 1 and/or FIG. 2 is assumed, the user has the important advantage that, irrespective of the charging architecture of the vehicle, he can carry out a charging operation at each of these charging stations in that he carries along a single charging cable or each charging station is equipped with a technically identical charging cable. A high degree of flexibility and a simple operability is thereby ensured. Furthermore, while the multiplicity of variants is low, the charging arrangement can be used worldwide.

Figure 9:
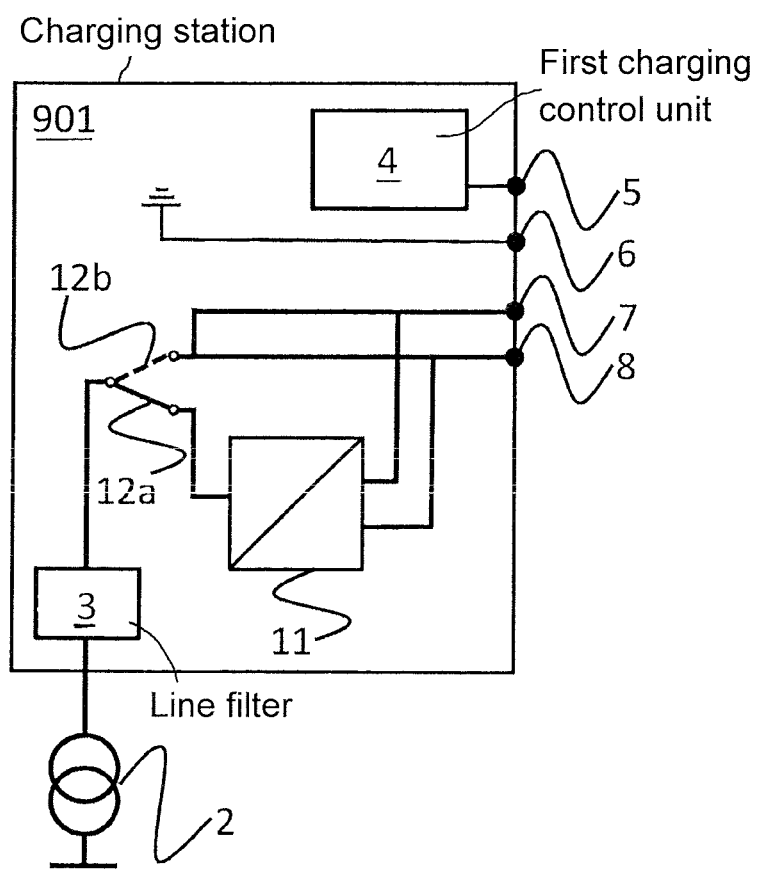
FIG. 9 is a schematic view of a simplified charging station having a 1-phase external alternating-current network.

FIG. 9 illustrates a special embodiment of a simplified charging station 901, which is supplied by an external alternating-current network 2 that has a 1-phase construction. A line filter 3 or grid filter can be used for smoothing the electric power. The charging station has a first charging control unit 4 and a first ac-to-dc converter 11. The charging station has six electric taps toward the exterior, only four electric taps being functional or usable toward the exterior. In this case, as an alternative, the charging station may therefore have only four electric taps 5-8. The first electric tap 5 is connected with the charging control unit. The second electric tap 6 is connected with a grounding protection line. The charging station has a two-position switch which, in the first switching position 12*a*, supplies electric power to the ac-to-dc converter. The output of the ac-to-dc converter is connected with the third electric tap 7 and the fourth electric tap 8. The third electric tap is situated on the positive direct-current potential and the fourth electric tap is situated on the negative direct-current potential. In the second switching position 12*b*, the switch connects the neutral phase of the external alternating-current network with the third electric tap 7 and connects the conduction phase with the fourth electric tap 8. Such a charging station can be installed as a charging pole in the public space or as a so-called wall box at a private house connection.

Figure 10:
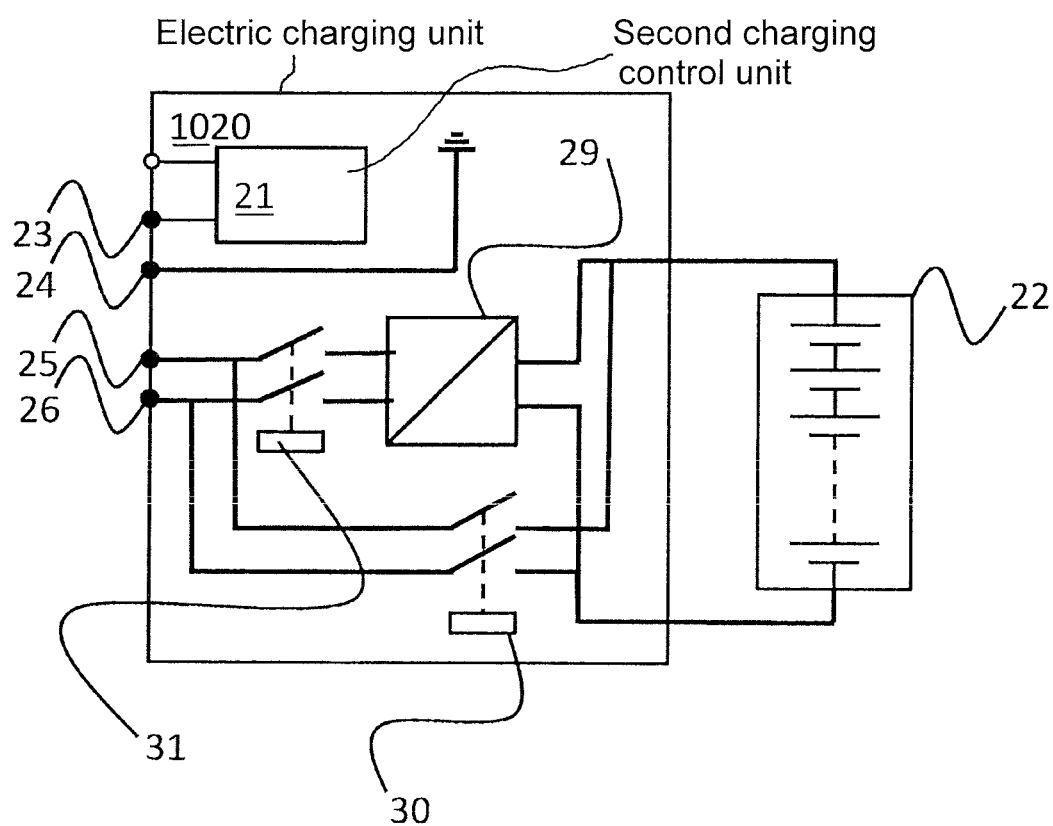
FIG. 10 is a schematic view of a simplified electric charging unit for alternating-current charging having a 1-phase charging device and for direct-current charging.

FIG. 10 illustrates a special embodiment of a simplified electric charging unit 1020 of a vehicle. The vehicle has an electric energy storage device 22. The electric charging unit has a second charging control unit 31 and a socket to which a charging cable can be connected. The socket is preferably mounted in an easily accessible manner on the vehicle shell. The socket has six electric contacts, only four electric contacts being functionally used. As an alternative, the electric charging unit or the socket may therefore also only have four electric contacts 23-26. The second charging control unit 31 is connected with the first electric contact 23. The second electric contact 24 is connected with a grounding protection line. Furthermore, the second charging control unit 31 may be connected with an additional electric contact in the socket, which is used as a proximity contact or proxy contact. The electric charging unit has a second switch system 30. In the open switching position, the second switch system separates the electric energy storage device from the third electric contact 25 and from the fourth electric contact 26. In the closed switching position, the third electric contact is connected with the positive potential of the electric energy storage device and the fourth electric contact is connected with the negative potential of the electric energy storage device. In addition, the electric charging unit is equipped with an ac-to-dc converter 29 which operates as a charging device. On the input side, the charging device is designed for 1-phase alternating current, the input being connected by way of an optional third switch system 31 for the neutral phase with the third electric contact 25, and the input for the conduction phase being connected with the fourth electric contact 26. On the output side, it supplies the electric energy storage device with charging current.

At a charging station according to FIG. 9, a vehicle according to FIG. 10 can be charged by a charging cable. If the charging station according to FIG. 9 has six electric taps and the electric charging unit according to FIG. 10 has six electric contacts, a charging cable according to FIG. 3 can be used. If, as an alternative, the charging station according to FIG. 9 has only four electric taps or, as an alternative, the electric charging unit according to FIG. 10 has only four electric contacts, a charging cable with our four electric lines 14-17 can also be used by taking into account the same configuration. The first charging control unit 4 adjusts the two-position switch to the first switching position 12a in order to supply the electric charging unit of the vehicle with direct current (direct-current charging). The second charging control unit 21 closes the second switch system 30. As a result, the battery is charged by way of the third 16 and the fourth electric line 17. The first charging control unit adjusts the two-position switch of the charging station to the second switching position 12a, in order to supply the electric charging unit of the vehicle with alternating current (alternating-current charging). During the alternating-current charging, the second charging control unit opens the second switch system 30 and closes the (optional) third switch system 31. The 1-phase charging device is thereby supplied with alternating current by way of the third 16 and the fourth 17 electric line, which supplies the battery with direct charging current. The battery is uncoupled from the third and fourth electric line which each transfers electric power in the form of alternating current. Summarizing, a vehicle according to FIG. 10 can be charged with alternating current or direct current at a charging station according to FIG. 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

101/201/901 Charging station
2 External alternating-current network
3 Grid filter
4 First charging control unit
First electric tap
6 Second electric tap
7 Third electric tap
8 Fourth electric tap
9 Fifth electric tap
10 Sixth electric tap
11 First ac-to-dc converter
12a Two-position switch, first switching position
12b Two-position switch, second switching position
13 First switch system
14 First electric line
15 Second electric line
16 Third electric line
17 Fifth electric line
19 Sixth electric line
21 Second charging control unit
420/520/620/720/820/1020 Electric charging unit
22 Electric energy storage device
23 First electric contact
24 Second electric contact
25 Third electric contact
26 Fourth electric contact
27 Fifth electric contact
28 Sixth electric contact
29 Charging device, second ac-to-dc converter
30 Second switch system
31 Third switch system

What is claimed is:
1. A vehicle charging arrangement comprising:
a charging station outside of a vehicle, the charging station comprising a first charging control unit that is electrically connected with a first electric tap, a second electric tap connected to a second electric line, a two-position switch controlled by the first charging control unit having a first switching position and a second switching position such that, in the second switching position, a third electric tap is connected with a neutral phase of the external alternating-current network;
a charging cable; and
an electric charging unit of the vehicle, for charging an electric energy storage device of the vehicle with electric energy from an external alternating-current network, wherein the electric charging unit comprises a second charging control unit that is connected with a first electric contact and a second electric contact connected to the second electronic line, wherein:
during the charging, the first charging control unit and the second charging control unit exchange data by way of a first electric line and the second electric line is used as a grounding line,
on an input side, the charging station is configured to be supplied with electric power from the external alternating-current network, the charging cable is electrically connected to the charging station or is configured to be electrically connected to the charging station, the charging cable is configured to be electrically connected to the electric charging unit by way of a plug-and-socket connection, the charging station has six electric taps, the charging cable has six electric lines, and the six electric taps of the charging station are connected in the same configuration with the six electric lines of the charging cable, and the six electric lines of the charging cable are connected in the same configuration with at least four electric contacts of the electric charging unit in order to charge the electric energy storage device.

2. The vehicle charging arrangement according to claim 1, wherein:

the charging station has a first ac-to-dc converter, in the first switching position, the first ac-to-dc converter is supplied on the input side from the external alternating-current network, and in the second switching position, a fourth electric tap is connected with a conduction phase of the external alternating-current network.

3. The vehicle charging arrangement according to claim 2, wherein:

the external alternating-current network is constructed as a 1-phase alternating-current network, the first ac-to-dc converter is constructed as a 1-phase ac-to-dc converter, and the first 1-phase ac-to-dc converter is connected on an output side with a fifth electric tap and a sixth electric tap.

4. The vehicle charging arrangement according to claim 2, wherein:

the external alternating-current network is constructed as an external 3-phase alternating-current network, the first ac-to-dc converter is constructed as a 3-phase ac-to-dc converter, the first 3-phase ac-to-dc converter is connected on an output side by way of a first switch system with a fifth electric tap and a sixth electric tap, and in the second switching position, the fifth electric tap and the sixth electric tap are each connected with a conduction phase of the external 3-phase alternating-current network.

5. The vehicle charging arrangement according to claim 3, wherein:

the electric charging unit has a 1-phase charging device, the 1-phase charging device is connected on the input side with a third electric contact and a fourth electric contact, the 1-phase charging device is connected on the output side with the electric energy storage device, and the switch is switched to the second switching position in order to charge the electric energy storage device.

6. The vehicle charging arrangement according to claim 4, wherein:

the electric charging unit has a 1-phase charging device, the 1-phase charging device is connected on the input side with a third electric contact and a fourth electric contact, the 1-phase charging device is connected on the output side with the electric energy storage device, and the switch is switched to the second switching position in order to charge the electric energy storage device.

7. The vehicle charging arrangement according to claim 3, wherein:

the electric charging unit has a 3-phase charging device, the 3-phase starting device is connected on the input side with a third electric contact, a fourth electric contact, a fifth electric contact and a sixth electric contact, the 3-phase charging device is connected on the output side with the electric energy storage device, and the switch is switched to the second switching position in order to charge the electric energy storage device.

8. The vehicle charging arrangement according to claim 4, wherein:

the electric charging unit has a 3-phase charging device, the 3-phase starting device is connected on the input side with a third electric contact, a fourth electric contact, a fifth electric contact and a sixth electric contact, the 3-phase charging device is connected on the output side with the electric energy storage device, and the switch is switched to the second switching position in order to charge the electric energy storage device.

9. The vehicle charging arrangement according to claim 3, wherein:

the electric charging unit has a second switch system, the second switch system connects a fifth electric contact and a sixth electric contact with the electric energy storage device, and in order to charge the electric energy storage device, the switch is switched to the second switching position and the second switch system is closed.

10. The vehicle charging arrangement according to claim 4, wherein:

the electric charging unit has a second switch system, the second switch system connects a fifth electric contact and a sixth electric contact with the electric energy storage device, and in order to charge the electric energy storage device, the switch is switched to the first switching position, the first switch system is closed, and the second switch system is closed.

11. The vehicle charging arrangement according to claim 3, wherein:

the electric charging unit has a 1-phase charging device, the 1-phase charging device is connected on the input side with a third electric contact and a fourth electric contact, the 1-phase charging device is connected on the output side with the electric energy storage device, the electric charging unit has a second switch system, the second switch system connects a fifth electric contact and a sixth electric contact with the electric energy storage device, and in order to charge the electric energy storage device, the switch is switched to the first switching position and the second switch system is closed, or the switch is switched to the second switching position and the second switch system is opened.

12. The vehicle charging arrangement according to claim 4, wherein:

the electric charging unit has a 1-phase charging device, the 1-phase charging device is connected on the input side with a third electric contact and a fourth electric contact, the 1-phase charging device is connected on the output side with the electric energy storage device, the electric charging unit has a second switch system, the second switch system connects a fifth electric contact and a sixth electric contact with the electric energy storage device, and in order to charge the electric energy storage device, the switch is switched to the first switching position, the first switch system is closed, and the second switch system is closed, or the switch is switched to the second switching position and the second switch system is opened.

13. The vehicle charging arrangement according to claim 3, wherein:
the electric charging unit has a 3-phase charging device and a second switch system,
the 3-phase charging device is connected on the input side with a third electric contact and with a fourth electric contact and is connected by way of the second switch system with a fifth electric contact and a sixth electric contact,
the 3-phase charging device is connected on the output side with the electric energy storage device,
the electric charging unit has a third switch system,
the third switch system connects the fifth electric contact and the sixth electric contact with the electric energy storage device, and
in order to charge the electric energy storage device, the switch is switched to the first switching position, the second switch system is opened, and the third switch system is closed, or the switch is switched to the second position.

14. The vehicle charging arrangement according to claim 4, wherein:
the electric charging unit has a 3-phase charging device and a second switch system,
the 3-phase charging device is connected on the input side with a third electric contact and with a fourth electric contact and is connected by way of the second switch system with a fifth electric contact and a sixth electric contact,
the 3-phase charging device is connected on the output side with the electric energy storage device,
the electric charging unit has a third switch system,
the third switch system connects the fifth electric contact and the sixth electric contact with the electric energy storage device,
in order to charge the electric energy storage device, the switch is switched to the first switching position, the first switch system is closed, the second switch system is opened, and the third switch system is closed, or the switch is switched to the second switching position and the third switch system is opened.

\* \* \* \* \*